No. 738,944. PATENTED SEPT. 15, 1903.
A. C. RIOUX.
MOWER BAR.
APPLICATION FILED FEB. 11, 1903.
NO MODEL.
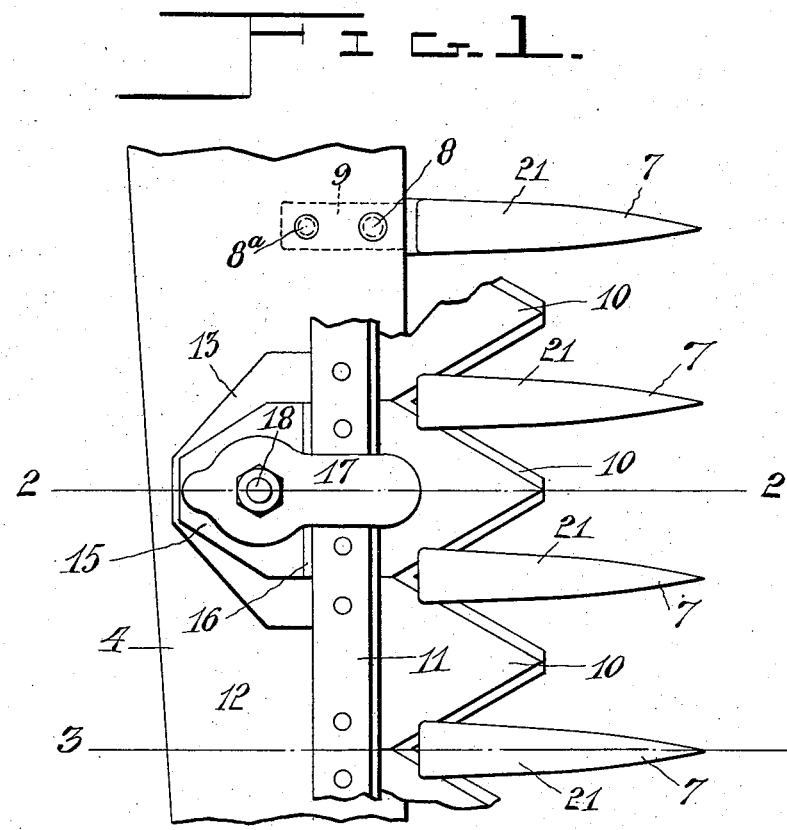
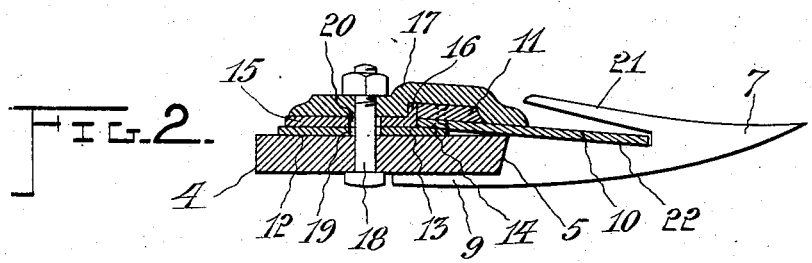
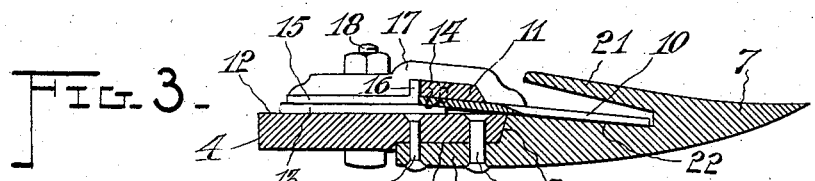
Witnesses: Alfred C. Rioux, Inventor,
By Marion & Marion
Attorneys No. 738,944. Patented September 15, 1903.

UNITED STATES PATENT OFFICE.

ALFRED CALIXTE RIOUX, OF TORONTO, CANADA.

MOWER-BAR.

SPECIFICATION forming part of Letters Patent No. 738,944, dated September 15, 1903.

Application filed February 11, 1903. Serial No. 142,830. (No model.)

*To all whom it may concern:*

Be it known that I, ALFRED CALIXTE RIOUX, a subject of the King of Great Britain, residing at Toronto, county of York, Province of Ontario, Canada, have invented certain new and useful Improvements in Mower-Bars; and I do hereby declare that the following is a full, clear, and exact description of the invention, such as will enable others skilled in the art to which it appertains to make and use the same.

My invention relates to mowing-machines or harvesters; and my object is to provide an improved form of mower-bar for implements of this kind which is so constructed as to avoid the formation of recesses or crevices upon the bar which are adapted to give opportunity for grass or weeds to become caught in the bar in such a manner as to "choke" or "clog" the same and resist the movement of the knives. Such a clogging effect frequently occurs in practice, and while it is due primarily to the simple fact that grass has been caught in the bar the difficulty is aggravated from the fact that this grass is apt to find its way under the knives, forcing them away from the ledger plates or guards, so that additional opportunity is formed for more grass being caught in the same manner.

The invention consists in the construction and combination of parts to be more fully described hereinafter and definitely set forth in the claims.

In the drawings, which fully illustrate my invention, Figure 1 represents a portion of my mower-bar in plan. Fig. 2 represents a cross-section of the same, taken substantially on the line 2 2 of Fig. 1. Fig. 3 is also a cross-section of this bar and taken on the line 3 3 of Fig. 1.

Throughout the drawings and specification the same numerals of reference indicate like parts.

Referring more particularly to the parts, 4 represents the body of the mower-bar, which consists, substantially, of a flat horizontally-disposed bar which tapers toward its outer extremity in the usual manner. The forward edge of this bar is slightly beveled, as indicated at 5, and upon its lower side it is provided with a plurality of recesses or notches 6 to afford opportunity for attaching the guards 7 by means of rivets 8 $8^a$, the said guards being provided with reduced rearwardly-projecting shanks 9 for this purpose. These guards 7 comprise the usual wings 21 and flat faces 22 below said wings, upon which the cutters 10 or knives are adapted to slide as they are reciprocated in the usual manner. These cutters 10 are of the usual form, consisting, substantially, of triangular plates, the rear edges of which are attached to a knife-back 11, extending longitudinally upon the mower-bar, as shown. It should appear from inspection of Figs. 2 and 3 that the rear edges of these knives 10 are in alinement with the rear edge of the knife-back 11.

Upon the upper face 12 of the aforesaid body 4 and disposed at suitable distances apart there are arranged a plurality of wearing-plates 13. Near their inner edges these wearing-plates are provided with inclined upper faces 14, which are adapted to constitute a support for the rear edges of the cutters 10, these inclined faces 14 being in substantial alinement with the aforesaid faces 22 of the guards. Above the wearing-plates rider-plates 15 are provided, which may be formed substantially as shown and which comprise upwardly-projecting flanges 16 at their forward edges, and these flanges are adapted to abut against the rear edges of the knife-back 11 and the knives 10. Clips 17 are provided, which are shaped upon their lower sides so as to conform to the parts to which they are applied, each clip being secured in place by a through-bolt 18 in the manner shown. For the purpose of permitting necessary adjustment from time to time the aforesaid wearing-plates and rider-plates are provided, respectively, with elongated openings 19 and 20, as will be readily understood. It should be observed from Fig. 1 that these clips 17, together with the parts immediately connected therewith, are disposed always between the guards.

From the arrangement described it should appear that a very compact construction is formed which is substantially free from any crevices or recesses in which grass or other vegetation could become attached.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having thus described my invention, what I claim as new, and desire to secure by Letters Patent, is—

1. In combination, a bar, a plurality of guards carried thereby, a knife coöperating with said guards, wearing-plates adapted to form a support under the rear edge of said knife, rider-plates above said wearing-plates and having upwardly-turned flanges abutting the rear of said knife, clips carried above said rider-plates and adapted to guide said knife, and bolts passing through said clips and said bar, said rider-plates and said wearing-plates having elongated openings through which said bolts pass.

2. In combination, a bar having recesses on the lower side thereof, a plurality of guards carried respectively in said recesses, a plurality of cutters coöperating with said guards, a knife-back to which said cutters are attached, the rear edge whereof is in alinement with the rear edges of said cutters, wearing-plates having inclined upper faces constituting a support beneath said cutters, rider-plates carried thereabove and abutting against the alining rear edges of said knife-back and said cutters, clips adapted to guide said knife-back and cutters, and bolts passing through said clips and said bar, said rider-plates and said wearing-plates having alining elongated openings through which said bolts pass.

3. In combination, a bar having a plurality of recesses upon the lower side thereof, guards having reduced shanks carried in said recesses, a plurality of cutters coöperating with said guards, a knife-back above said cutters and to which the same are attached, the rear edges of said cutters and said knife-back being in alinement, wearing-plates having inclined upper faces at their forward edges adapted to support the rear edges of said cutters, rider-plates carried thereabove and having flanges at their inner edges adapted to abut the rear edges of said knife-back and said cutters, clips carried by said rider-plates and said knife-back, and through-bolts adapted to secure said clips to said bar, said rider-plates and said wearing-plates having elongated openings through which said bolts pass.

4. In combination, a substantially flat bar having a beveled forward edge and recesses on the under side thereof, guards having reduced shanks attached in said recesses, said guards comprising wings and substantially flat faces therebelow, a plurality of cutters, a knife-back on the upper side of said cutters and to which the same are attached, the rear edges of said knife-back and said cutters being in alinement, wearing-plates carried upon the upper side of said bar and having inclined upper faces at their forward edges in substantial alinement with the aforesaid faces of said guards, rider-plates carried thereabove, said rider-plates and said wearing-plates having alining elongated openings, said rider-plates abutting the rear edge of said cutters and knife-back, and clips carried thereabove with bolts passing through the same and said bar, said bolts passing through said elongated openings.

In witness whereof I have hereunto set my hand in the presence of two witnesses.

ALFRED CALIXTE RIOUX.

Witnesses:
W. H. JOHNSTON,
J. D. RIOUX.